Feb. 25, 1930. H. T. HART 1,748,602
CLAMP
Filed July 8, 1929
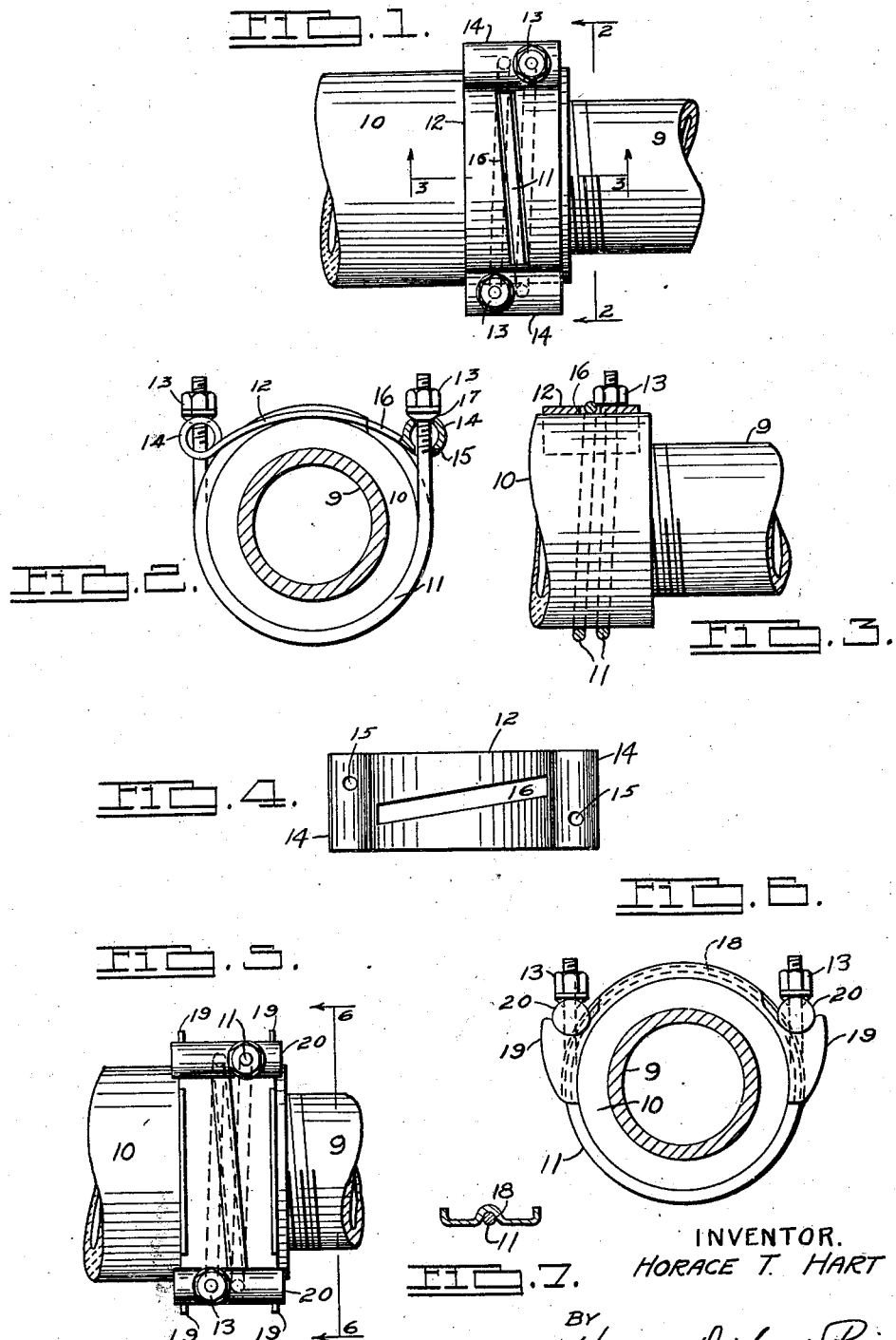
INVENTOR.
HORACE T. HART
BY
Harness, Dickey & Pierce
ATTORNEYS Patented Feb. 25, 1930

1,748,602

UNITED STATES PATENT OFFICE

HORACE T. HART, OF DETROIT, MICHIGAN

CLAMP

Application filed July 8, 1929. Serial No. 376,825.

This invention relates to that class of devices commonly known as hose clamps, the principal object being to provide a clamp that is easy to apply, simple in construction and effective in use.

Another object is to provide a device of the type described by which a perfect seal between a pipe and a hose may be established and maintained under relatively high pressures.

Another object is to provide a device that will produce a bond of such strength that the hose and the pipe will not separate axially when a high pressure is established and maintained in a hose.

Another object is to provide a device by which more than one turn of a wire may be drawn up circumferentially around a hose by means of a saddle member which anchors the free threaded ends of the wire through screw means.

A further object is to provide a clamping device that will have a uniform radial bearing pressure on all parts of the hose over more than 360 degrees.

The above being among the objects of the present invention, same consists in certain novel features of construction and combinations of parts to be hereinafter described with reference to the accompanying drawings, and then claimed, having the above and other objects in view.

In the accompanying drawing, which illustrates the suitable embodiment of the present invention, and in which like numerals refer to like parts throughout the several different views, Fig. 1 is a plan view of my clamping device shown attached to a cylindrical pipe and illustrating the manner in which hose and pipe are connected thereby.

Fig. 2 is an end view taken on the line 2—2 of Fig. 1, with parts thereof broken away to better illustrate the construction.

Fig. 3 is a section taken on line 3—3 of Fig. 1.

Fig. 4 is a plan view of the same circular saddle which acts as an anchor for the ends of the wire.

Fig. 5 is a similar view of Fig. 1 in modified form.

Fig. 6 is an end view of Fig. 5.

Fig. 7 is a transverse section through the saddle member shown in Figures 5 and 6.

I have found that the greatest objections to hose fastening devices of this type used in high pressure work is the difficulty of tightening the device to such an extent as to keep the pipe from moving out axially and still maintain a perfect seal. Another difficulty I have found in hose clamping devices is that a difficult, tedious and unhandy operation must be gone through to either clamp or unclamp them, which in turn takes much time. Another difficulty in hose clamping devices is that the radial pressure is not distributed uniformly around 360 degrees and at high pressures a perfect seal is impossible. The principal object of providing the device herein shown and claimed is to provide a nonslip clamp that can be quickly and securely applied on the outer side of a hose to fasten a cylindrical pipe or other object in the end of the hose, and to provide a perfect seal between the hose and pipe.

To better illustrate the present invention I have shown in the drawing a pipe 9 received within a hose 10 and secured therein by a clamping device comprising a wire 11 having more than one turn about the hose 10, a saddle member 12 and nuts 13. The saddle member is preferably formed of sheet metal as shown into an approximately semi-circular form and seats directly on the hose 10. The ends of the saddle member are preferably reversely bent to form eyes 14, each of which is apertured as at 15 to receive an end of the wire 11. The ends of the wire 11 which project through the apertures are threaded and receive thereon the nuts 13 which bear against the upper surfaces of the eyes 14. It will be apparent that upon threading the nuts 13 down on the ends of the wire the wire will be drawn through the eyes and this will tend to contract the coil which will thus exert a radial clamping pressure on the hose 10 tending to clamp it on the pipe 9.

In order to prevent possible interference with the proper seating of the saddle 13 on the hose 10 it is preferable to form a slot such as 16 in the body of the saddle for reception of that portion of the wire coil 11 which extends under the saddle 13, it being understood that where more turns of wire are employed than shown, a correspondingly greater number of such slots 16 are preferably provided.

Also, in order to provide a greater bearing area between the nuts 13 and eyes 14, the apertures 15 are preferably countersunk as at 17. Furthermore, in order to prevent any bending forces to be set up in the ends of the wire 11 where they pass through the eyes 14, the contact surfaces between the nuts 13 and the eyes 14 are preferably formed spherical in shape to allow the nuts and therefore the wire to adjust themselves to take tensional loads only.

It will be apparent from the above description that by a small force on the nuts 13 and with enough surface threadably engaged to keep threads from stripping, the wire will be drawn up through the aperture in the eye thereby causing a contraction of the wire. Since the wire bearing on the hose extends over 360 degrees, a secure fastening is obtained which resists all axial or radial movements of the object secured within the hose and provides a perfect seal, even at very high pressures, It will also be apparent that as many turns of wire as is feasible for the particular job may be used. Not only is the device herein shown and described readily attachable to a hose, but it also provides a uniform radial pressure on all parts of the outer surface of the hose.

The construction illustrated in Figs. 1 to 4 inclusive may of course be modified in various manners to effect the same result without departing from the present invention. One method of modifying the construction is shown in Figs. 5 and 6. In this case the approximate semi-circular body of the saddle is provided with passages 18 to allow the wire to surround the hose without being restricted by the saddle. Outturned ears 19 are formed adjacent the ends of the saddle in such a manner as to seat the bars 20 which are apertured to serve the same purpose as the end eyes 14 of the preferred form. In this type of construction, one end of the wire may be secured to one of the bars and only one end of the wire need be threaded, which in turn requires but one nut and saves much time. In this modified form, one nut need only be loosened slightly to allow one of the bars to be slipped off of its seat and the wire to be unwound.

In describing this device for use in connection with hoses to withstand high pressures, it is to be understood that I do not limit myself to any particular use of the same. This clamp may be used for any type of connection between a hollow cylinder of flexible material and a pipe, bar, or other object with a cylindrical surface that will fit inside the aforementioned hollow cylinder.

Formal changes may be made in the specific embodiment of the invention described without departing from the spirit and substance of the broad invention, the scope of which is commensurate with the appended claims.

What I claim is:

1. A clamping device for a hose comprising an arcuate anchor saddle with reversely turned eyes on each end, said eyes having countersunk holes presenting spherically shaped seats, a tension member adapted to make more than one turn around a cylindrical body and having its face ends extending through said holes, and nuts on the ends of said tension member with bearing faces complementary to said spherical shaped seats and seated thereon for radially contracting said tension member.

2. A clamping device for a hose comprising, in combination, a tension member, a saddle with outturned ears on each side, bars seated in said outturned ears, and screw means to radially contract the tension member by cooperation of the bar and said wire.

3. A clamping device for a hose comprising a saddle with outturned ears and two bars seated on the ears, a wire secured to one of said bars at one end and threaded at the other end, and screw means threadably engaging the threaded end of said wire and bearing on the other of said bars.

4. A clamp for a hose comprising a saddle member having an eye on each end thereof, a tension member adapted to make more than one turn around a hose, means for securing the free ends of said tension member to said eye respectively, one of said saddle ends having a spherical seat, and a member having a complementary base fitted in said seat for engaging the end of said tension member.

5. A clamping device for a hose comprising a resilient arcuate saddle having its main body portion formed on a greater radius than the hose to which it is to be applied, a tension member adapted to make more than one turn around the hose, and means for adjustably securing the ends of said tension member to the ends of said saddle.

HORACE T. HART.